United States Patent
Li et al.

(10) Patent No.: US 10,536,988 B2
(45) Date of Patent: Jan. 14, 2020

(54) CHANNEL ACCESS METHOD AND APPARATUS

(71) Applicant: Huawei Technologies Co., Ltd., Shenzhen (CN)

(72) Inventors: Yunbo Li, Shenzhen (CN); Yanchun Li, Shenzhen (CN); Yi Luo, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 42 days.

(21) Appl. No.: 15/822,815

(22) Filed: Nov. 27, 2017

(65) Prior Publication Data

US 2018/0084605 A1 Mar. 22, 2018

Related U.S. Application Data (63) Continuation of application No. PCT/CN2015/079987, filed on May 27, 2015.

(51) Int. Cl.
*H04W 84/12* (2009.01)
*H04J 11/00* (2006.01)

(52) U.S. Cl.
CPC ...... *H04W 84/12* (2013.01); *H04J 2011/0016* (2013.01)

(58) Field of Classification Search
CPC ....... H04J 2011/0016; H04W 74/0858; H04W 84/12; H04W 74/0833; H04W 52/0216; H04W 72/04; H04W 74/0816; H04W 72/0446; H04W 74/0808; H04W 74/004; H04W 74/085
See application file for complete search history.

(56) References Cited

U.S. PATENT DOCUMENTS 8,873,532 B2    10/2014   Kwon et al.
2009/0196273 A1  8/2009   Kwon et al.
(Continued)

FOREIGN PATENT DOCUMENTS

CN    102076106 A    5/2011
CN    102123514 A    7/2011
(Continued)

OTHER PUBLICATIONS

Adachi et al., "Regarding trigger frame in UL MU," IEEE 802.11-15/0608r1, pp. 1-16, Institute of Electrical and Electronics Engineers, New York, New York (May 10, 2015).
(Continued)

*Primary Examiner* — Awet Haile
(74) *Attorney, Agent, or Firm* — Leydig, Voit & Mayer, Ltd.

(57) ABSTRACT

A channel access process method in a wireless local area network is provided. The method includes: generating, by a station, a backoff counter value; then performing, by the station, a backoff operation after receiving a first trigger frame, where the backoff operation includes: deducting, from the backoff counter value, a quantity N of subchannels for random access, to obtain a new backoff counter value; and when the new backoff counter value is 0 or a negative number, randomly selecting, by the station, one subchannel from the subchannels for random access, and then accessing the subchannel to send an uplink frame. The present application further provides a corresponding channel access apparatus. Applying the method and the apparatus of the embodiments of the present application improves system access efficiency and avoids a waste of system resources.

11 Claims, 5 Drawing Sheets

(56) References Cited

U.S. PATENT DOCUMENTS

| | | |
|---|---|---|
| 2009/0201865 A1 | 8/2009 | Uemura et al. |
| 2012/0063409 A1 | 3/2012 | Novak et al. |
| 2014/0198642 A1 | 7/2014 | Barriac et al. |
| 2015/0009814 A1 | 1/2015 | Wu et al. |
| 2015/0057008 A1 | 2/2015 | Seok |
| 2015/0382380 A1 | 12/2015 | Li et al. |
| 2016/0073434 A1 | 3/2016 | Zhang et al. |
| 2016/0227579 A1* | 8/2016 | Stacey .............. H04W 74/0833 |
| 2018/0014334 A1* | 1/2018 | Ahn ....................... H04W 28/02 |
| 2018/0288743 A1* | 10/2018 | Choi ..................... H04W 76/10 |

FOREIGN PATENT DOCUMENTS

| | | |
|---|---|---|
| CN | 103298027 A | 9/2013 |
| CN | 104066145 A | 9/2014 |
| CN | 104185296 A | 12/2014 |
| CN | 104335662 A | 2/2015 |
| EP | 2819456 A1 | 12/2014 |
| EP | 2978273 A1 | 1/2016 |
| JP | 2008211585 A | 9/2008 |
| JP | 2014123993 A | 7/2014 |
| JP | 2016503998 A | 2/2016 |
| RU | 2409896 C2 | 1/2011 |
| WO | 2007139188 A1 | 12/2007 |
| WO | 2014110513 A1 | 7/2014 |
| WO | 2014146444 A1 | 9/2014 |
| WO | 2017196104 A1 | 11/2017 |

OTHER PUBLICATIONS

Ghosh et al.,"Random Access with Trigger Frames using OFDMA", IEEE 80211-15/0604r0, XP068094472, Institute of Electrical and Electronics Engineers, New York, New York (May 2015).

* cited by examiner

TF1: first trigger frame    BO: backoff counter value

CHANNEL ACCESS METHOD AND APPARATUS

CROSS-REFERENCE TO RELATED APPLICATIONS

This application is a continuation of International Application No. PCT/CN2015/079987, filed on May 27, 2015, the disclosure of which is hereby incorporated by reference in its entirety.

TECHNICAL FIELD

Embodiments of the present application pertain to the field of communications technologies, and in particular, to a channel access method and apparatus.

BACKGROUND

Orthogonal Frequency Division Multiple Access (OFDMA) channel access is a hotspot technology being discussed in the next-generation Wireless Local Area Network (WLAN) 802.11ax standard. In this technology, a channel is divided into multiple subchannels, and then multiple stations each select a subchannel for sending an uplink frame. Because this technology enables multiple stations to concurrently send uplink frames in a frequency domain, collisions between stations are mitigated.

Access efficiency of an OFDMA subchannel access solution in the conventional art needs to be further improved. In addition, in an existing solution, two backoff counters are used to respectively perform backoff on the OFDMA channel access and conventional carrier sense multiple access with collision avoidance (CSMA/CA) channel access, increasing system complexity.

SUMMARY

In view of this, the present application provides a new OFDMA channel access method and apparatus, to improve system access efficiency. In addition, backoff may be performed on an OFDMA channel access process and a CSMA/CA channel access process by using one backoff counter, reducing system complexity.

According to a first aspect, an embodiment of the present application provides a channel access method, applied to a wireless local area network, including:

A. generating, by a station, a backoff counter value, where the backoff counter value is randomly selected from [0, $CW_o$], $CW_o$ is a contention window for orthogonal frequency division multiple access OFDMA subchannel contention, and $CW_o$ is an integer greater than 0;

B. receiving, by the station, a first trigger frame, where the first trigger frame is sent by an access point, the first trigger frame indicates that a quantity of subchannels for random access is N, and N is an integer greater than or equal to 0;

C. performing, by the station, backoff, where the backoff operation includes: deducting, from the backoff counter value, the quantity N of subchannels for random access, to obtain a new backoff counter value; and if the new backoff counter value is 0 or a negative number, performing step D; or if the new backoff counter value is greater than 0, performing step B; and D. performing, by the station, channel access, including: randomly selecting, by the station, one subchannel from the subchannels for random access to send an uplink frame.

With reference to the first aspect, in a first possible implementation manner of the first aspect, the performing, by the station, channel access further includes:

receiving, by the station, a second trigger frame when the station fails in sending the uplink frame, where the second trigger frame is sent by the access point, and the second trigger frame includes a contention window adjustment parameter or a target $CW_o$ value; and adjusting, by the station, $CW_o$ after parsing the second trigger frame.

With reference to the first possible implementation manner of the first aspect, in a second possible implementation manner of the first aspect, the adjusting, by the station, $CW_o$ after parsing the second trigger frame specifically includes:

comparing the contention window adjustment parameter with a preset threshold; and when the parameter is greater than the threshold, increasing $CW_o$; or when the parameter is less than or equal to the threshold, keeping $CW_o$ unchanged.

With reference to the first possible implementation manner of the first aspect, in a third possible implementation manner of the first aspect, the adjusting, by the station, $CW_o$ after parsing the second trigger frame specifically includes:

comparing the contention window adjustment parameter with two preset thresholds; and when the parameter is greater than a first threshold, increasing $CW_o$; when the parameter is greater than a second threshold and is less than or equal to the first threshold, keeping $CW_o$ unchanged; or when the parameter is less than or equal to the second threshold, decreasing $CW_o$.

With reference to the first possible implementation manner of the first aspect, in a fourth possible implementation manner of the first aspect, the adjusting, by the station, $CW_o$ after parsing the second trigger frame specifically includes:

comparing, by the station, a $CW_o$ value before adjustment with the target $CW_o$ value; and when $CW_o$ is greater than the target $CW_o$ value, decreasing $CW_o$;

when $CW_o$ is equal to the target $CW_o$ value, keeping $CW_o$ unchanged; or when $CW_o$ is less than the target $CW_o$ value, increasing $CW_o$.

According to a second aspect, an embodiment of the present application provides a channel access method, applied to a wireless local area network, including:

A. generating, by a station, a backoff counter value;

B. performing, by the station, backoff, and updating the backoff counter value, specifically including:

B1. performing backoff by using a carrier sense multiple access with collision avoidance CSMA/CA mechanism after the station detects that a channel is idle for an interframe space XIFS; or B2. performing backoff according to an OFDMA contention mechanism after the station receives a first trigger frame, where the first trigger frame indicates a quantity N of subchannels for random access, and N is an integer greater than or equal to 0, where in step B1 and step B2, backoff is performed by using the same backoff counter; if the updated backoff counter value is 0 or a negative number, step C is performed; if the updated backoff counter value is greater than 0, step B is performed; and C. performing, by the station, channel access, specifically including:

if the backoff counter value is decreased to 0 by performing step B1, sending, by the station, an uplink frame by using an entire channel; or if the backoff counter value is decreased to 0 or a negative number by performing step B2, sending, by the station, an uplink frame after accessing a subchannel for random access.

With reference to the second aspect, in a first possible implementation manner of the second aspect, the performing backoff according to an OFDMA contention mechanism after the station receives a first trigger frame includes:

after the station receives the first trigger frame, decreasing the backoff counter value by βN, where β is a real number greater than or equal to 0.

With reference to the second aspect, in a second possible implementation manner of the second aspect, the performing backoff according to an OFDMA contention mechanism after the station receives a first trigger frame includes:

after the station receives the first trigger frame, decreasing the backoff counter value by 1.

With reference to the second aspect, in a third possible implementation manner of the second aspect, the performing backoff according to an OFDMA contention mechanism after the station receives a first trigger frame includes:

after the station receives the first trigger frame, decreasing the backoff counter value by 1 each time the station reads an available subchannel from the first trigger frame.

With reference to the second aspect and the foregoing implementation manners, in a fourth possible implementation manner of the second aspect, the sending, by the station, an uplink frame after accessing a subchannel includes:

randomly selecting, by the station, one subchannel from the subchannels for random access to send the uplink frame; or selecting, by the station, a subchannel on which the backoff counter value is exactly decreased to 0 to send the uplink frame.

With reference to the second aspect and the foregoing implementation manners, in a fifth possible implementation manner of the second aspect, the performing backoff by using a carrier sense multiple access with collision avoidance CSMA/CA mechanism after the station detects that a channel is idle for an interframe space XIFS includes:

after the station detects that a channel is idle for an interframe space XIFS, when the channel is idle for one timeslot, decreasing the backoff counter value by a until a channel status is changed to busy or the backoff counter value is decreased to 0, where a is a real number greater than or equal to 0.

With reference to the fifth possible implementation manner of the second aspect, in a sixth possible implementation manner of the second aspect, the performing, by the station, channel access further includes:

receiving, by the station, a second trigger frame when the station fails in sending the uplink frame, where the second trigger frame is sent by an access point, and the second trigger frame includes a contention window adjustment parameter or a target contention window CWo value; and adjusting, by the station, CWo after parsing the second trigger frame, where CWo is a contention window for orthogonal frequency division multiple access OFDMA subchannel contention With reference to the sixth possible implementation manner of the second aspect, in a seventh possible implementation manner of the second aspect, the adjusting, by the station, a contention window CWo after parsing the second trigger frame specifically includes:

comparing the contention window adjustment parameter with a preset threshold; and when the parameter is greater than the threshold, increasing CWo; or when the parameter is less than or equal to the threshold, keeping CWo unchanged.

With reference to the sixth possible implementation manner of the second aspect, in an eighth possible implementation manner of the second aspect, the adjusting, by the station, a contention window CWo after parsing the second trigger frame specifically includes:

comparing the contention window adjustment parameter with two preset thresholds; and when the parameter is greater than a first threshold, increasing CWo; when the parameter is greater than a second threshold and is less than or equal to the first threshold, keeping CWo unchanged; or when the parameter is less than or equal to the second threshold, decreasing CWo.

With reference to the sixth possible implementation manner of the second aspect, in a ninth possible implementation manner of the second aspect, the adjusting, by the station, a contention window CWo after parsing the second trigger frame specifically includes:

comparing, by the station, a CWo value before adjustment with the target CWo value; and when CWo is greater than the target CWo value, decreasing CWo;

when CWo is equal to the target CWo value, keeping CWo unchanged; or when CWo is less than the target CWo value, increasing CWo.

According to a third aspect, an embodiment of the present application provides a channel access apparatus, applied to a wireless local area network, including:

a generation unit, configured to generate a backoff counter value, where the backoff counter value is randomly selected from [0, CWo], CWo is a contention window for orthogonal frequency division multiple access OFDMA subchannel contention, and CWo is an integer greater than 0;

a backoff unit, configured to perform backoff, where the backoff operation includes: deducting, from the backoff counter value, the quantity N of subchannels for random access, to obtain a new backoff counter value;

a processing unit, configured to perform a determining operation to determine whether the backoff counter value is greater than 0; and a transceiver unit, configured to receive a first trigger frame, where the first trigger frame is sent by an access point, the first trigger frame indicates that the quantity of subchannels for random access is N, and N is an integer greater than or equal to 0, where the transceiver unit is further configured to perform channel access, including: sending an uplink frame on one subchannel of the subchannels for random access.

With reference to the third aspect, in a first possible implementation manner of the third aspect, the performing, by the transceiver unit, channel access further includes:

receiving, by the transceiver unit, a second trigger frame when the transceiver unit fails in sending the uplink frame, where the second trigger frame is sent by the access point, and the second trigger frame includes a contention window adjustment parameter or a target CWo value; and adjusting, by the processing unit, CWo after parsing the second trigger frame.

With reference to the first possible implementation manner of the third aspect, in a second possible implementation manner of the third aspect, the adjusting, by the processing unit, CWo after parsing the second trigger frame specifically includes:

comparing the contention window adjustment parameter with a preset threshold; and when the parameter is greater than the threshold, increasing CWo; or when the parameter is less than or equal to the threshold, keeping CWo unchanged.

With reference to the first possible implementation manner of the third aspect, in a third possible implementation manner of the third aspect, the adjusting, by the processing unit, CWo after parsing the second trigger frame specifically includes:

comparing the contention window adjustment parameter with two preset thresholds; and when the parameter is greater than a first threshold, increasing CWo; when the parameter is greater than a second threshold and is less than or equal to the first threshold, keeping CWo unchanged; or when the parameter is less than or equal to the second threshold, decreasing CWo.

With reference to the first possible implementation manner of the third aspect, in a fourth possible implementation manner of the third aspect, the adjusting, by the processing unit, CWo after parsing the second trigger frame specifically includes:

comparing, by a station, a CWo value before adjustment with the target CWo value; and when CWo is greater than the target CWo value, decreasing CWo;

when CWo is equal to the target CWo value, keeping CWo unchanged; or when CWo is less than the target CWo value, increasing CWo.

According to a fourth aspect, an embodiment of the present application provides a channel access apparatus, applied to a wireless local area network, including:

a generation unit, configured to generate a backoff counter value;

a backoff unit, configured to perform backoff and update the backoff counter value, specifically including:

performing backoff by using a carrier sense multiple access with collision avoidance CSMA/CA mechanism after a transceiver unit detects that a channel is idle for an interframe space XIFS; or performing backoff according to an OFDMA contention mechanism after a transceiver unit receives a first trigger frame, where the first trigger frame indicates a quantity N of subchannels for random access, and N is an integer greater than or equal to 0; and a processing unit, configured to perform a determining operation to determine whether the backoff counter value is greater than 0, where the transceiver unit is further configured to perform channel access, including:

if the backoff counter value is decreased to 0 by performing step B1, sending, by the transceiver unit, an uplink frame by using an entire channel; or if the backoff counter value is decreased to 0 or a negative number by performing step B2, sending, by the transceiver unit, an uplink frame after accessing a subchannel for random access.

With reference to the fourth aspect, in a first possible implementation manner of the fourth aspect, the performing backoff according to an OFDMA contention mechanism after a transceiver unit receives a first trigger frame includes:

after the transceiver unit receives the first trigger frame, decreasing the backoff counter value by $\beta N$, where $\beta$ is a real number greater than or equal to 0.

With reference to the fourth aspect, in a second possible implementation manner of the fourth aspect, the performing backoff according to an OFDMA contention mechanism after a transceiver unit receives a first trigger frame includes:

after the transceiver unit receives the first trigger frame, decreasing the backoff counter value by 1.

With reference to the fourth aspect, in a third possible implementation manner of the fourth aspect, the performing backoff according to an OFDMA contention mechanism after a transceiver unit receives a first trigger frame includes:

after the transceiver unit receives the first trigger frame, decreasing the backoff counter value by 1 each time the processing unit reads an available subchannel from the first trigger frame.

With reference to the fourth aspect and the foregoing implementation manners, in a fourth possible implementation manner of the fourth aspect, the sending, by the transceiver unit, an uplink frame after accessing a subchannel includes:

randomly selecting, by the transceiver unit, one subchannel from the subchannels for random access to send the uplink frame; or selecting, by the transceiver unit, a subchannel on which the backoff counter value is exactly decreased to 0 to send the uplink frame.

With reference to the fourth aspect and the foregoing implementation manners, in a fifth possible implementation manner of the fourth aspect, the performing backoff by using a carrier sense multiple access with collision avoidance CSMA/CA mechanism after the transceiver unit detects that a channel is idle for an interframe space XIFS includes:

after the transceiver unit detects that a channel is idle for an interframe space XIFS, when the channel is idle for one timeslot, decreasing the backoff counter value by a until a channel status is changed to busy or the backoff counter value is decreased to 0, where a is a real number greater than or equal to 0.

With reference to the fifth possible implementation manner of the fourth aspect, in a sixth possible implementation manner of the fourth aspect, the performing, by the transceiver unit, channel access further includes:

receiving, by the transceiver unit, a second trigger frame when the transceiver unit fails in sending the uplink frame, where the second trigger frame is sent by an access point, and the second trigger frame includes a contention window adjustment parameter or a target contention window CWo value; and adjusting, by the processing unit, CWo after parsing the second trigger frame, where CWo is a contention window for orthogonal frequency division multiple access OFDMA subchannel contention.

With reference to the sixth possible implementation manner of the fourth aspect, in a seventh possible implementation manner of the fourth aspect, the adjusting, by the processing unit, a contention window CWo after parsing the second trigger frame specifically includes:

comparing the contention window adjustment parameter with a preset threshold; and when the parameter is greater than the threshold, increasing CWo; or when the parameter is less than or equal to the threshold, keeping CWo unchanged.

With reference to the sixth possible implementation manner of the fourth aspect, in an eighth possible implementation manner of the fourth aspect, the adjusting, by the processing unit, a contention window CWo after parsing the second trigger frame specifically includes:

comparing the contention window adjustment parameter with two preset thresholds; and when the parameter is greater than a first threshold, increasing CWo; when the parameter is greater than a second threshold and is less than or equal to the first threshold, keeping CWo unchanged; or when the parameter is less than or equal to the second threshold, decreasing CWo.

With reference to the sixth possible implementation manner of the fourth aspect, in a ninth possible implementation manner of the fourth aspect, the adjusting, by the processing unit, a contention window CWo after parsing the second trigger frame specifically includes:

comparing, by a station, a CWo value before adjustment with the target CWo value; and when CWo is greater than the target CWo value, decreasing CWo;

when CWo is equal to the target CWo value, keeping CWo unchanged; or when CWo is less than the target CWo value, increasing CWo.

According to the embodiments of the present application, in a channel access process of a wireless local area network, one backoff counter is used for OFDMA subchannel access and CSMA/CA channel access, reducing system complexity. In addition, in an OFDMA subchannel access process, random channel access is used, improving system access efficiency.

DESCRIPTION OF EMBODIMENTS

To make the objectives, technical solutions, and advantages of the present application clearer, the following further describes the embodiments of the present application in detail with reference to the accompanying drawings. To comprehensively understand the present application, the following description mentions many specific details. However, persons skilled in the art should understand that the present application may be implemented without requiring these specific details. Apparently, the described embodiments are a part rather than all of the embodiments of the present application. All other embodiments obtained by persons of ordinary skill in the art based on the embodiments of the present application without creative efforts shall fall within the protection scope of the present application.

The embodiments of the present application may be applied to a wireless local area network (WLAN). Currently, a standard used in the WLAN is an Institute of Electrical and Electronics Engineers (IEEE) 802.11 series. The WLAN may include multiple basic service sets (BSS). A network node in a basic service set is a station (STA). The station includes an access point station(AP) and a non-access point station (Non-AP STA). Each basic service set may include one AP and multiple Non-AP STAs associated with this AP.

The access point station is also referred to as a wireless access point, a hotspot, or the like. The AP is an access point used by a mobile user to access a wired network, and is mainly deployed at home, inside a building, and inside a campus, with a typical coverage radius of dozens of meters and a hundred of meters. Certainly, the AP may alternatively be deployed outdoors. The AP is equivalent to a bridge connecting a wired network and a wireless network, and a main role of the AP is to connect various wireless network clients together, and then connect the wireless network to an Ethernet. Specifically, the AP may be a terminal device or a network device carrying Wireless Fidelity (WiFi) chip. Optionally, the AP may be a device supporting the 802.11ax standard. Further, optionally, the AP may be a device supporting multiple WLAN standards such as 802.11ac, 802.11n, 802.11g, 802.11b, and 802.11a.

The non-access point station (Non-AP STA) may be a wireless communications chip, a wireless sensor, or a wireless communications terminal, such as a mobile phone supporting a WiFi communication function, a tablet computer supporting the WiFi communication function, a set top box supporting the WiFi communication function, a smart television supporting the WiFi communication function, an intelligent wearable device supporting the WiFi communication function, an in-vehicle communication device supporting the WiFi communication function, and a computer supporting the WiFi communication function. Optionally, the station may support the 802.11ax standard. Further, optionally, the station supports multiple WLAN standards such as 802.11ac, 802.11n, 802.11g, 802.11b, and 802.11a.

Figure 1:
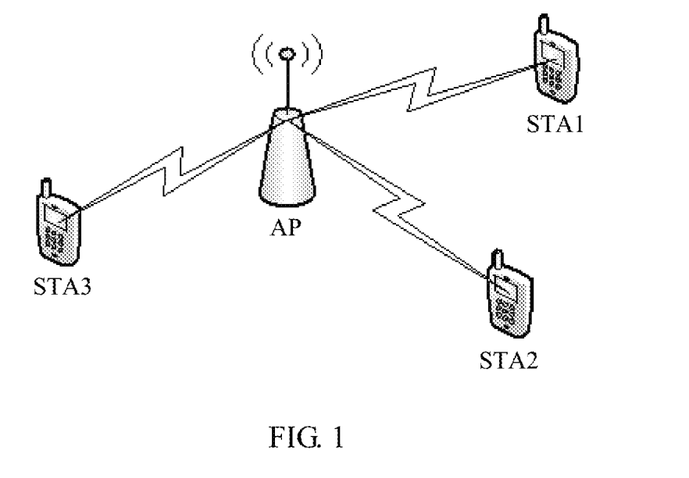
FIG. 1 is a diagram of an application scenario according to an embodiment of the present application.

FIG. 1 is a schematic diagram of a system of a typical WLAN deployment scenario, including one AP and three STAs. The AP separately communicates with STA 1, STA 2, and STA 3.

In the conventional art 1, two backoff counters are used, where one backoff counter is used for CSMA/CA channel access, and the other backoff counter is used for OFDMA channel access. An OFDMA channel access process is as follows:

A station uniformly and randomly selects an integer from [0, CWo] as a backoff counter value, where CWo is a contention window for an OFDMA subchannel contention.

When the station receives a trigger frame, for each available subchannel indicated in the trigger frame, a backoff counter performs an operation of decreasing by 1 each time. A quantity of subchannels for random access is N, which is indicated by the trigger frame, and N is an integer greater than 0.

After the backoff counter value is decreased to 0, the station sends an uplink frame on a subchannel on which the backoff counter value is decreased to 0.

Embodiment 1

Figure 2:
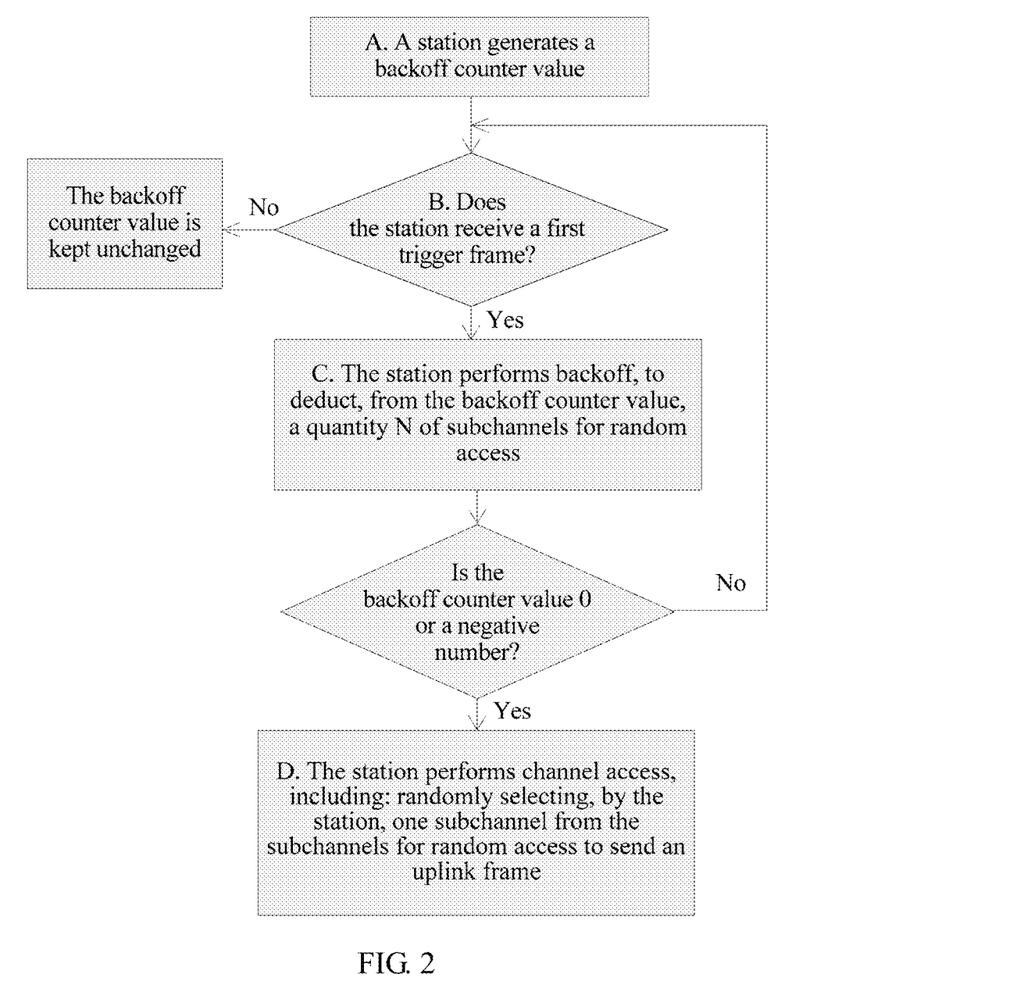
FIG. 2 is a block diagram of a process according to Embodiment 1 of the present application.

Embodiment 1 of the present application provides a channel access method that is applied to a WLAN. The method may be applied to a station, such as an AP and STA 1 to STA 3 in FIG. 1. The station may support a next-generation WLAN standard, such as the 802.11ax standard. FIG. 2 is a flowchart of the channel access method. Specific steps are as follows:

A. A station generates a backoff counter value, where the backoff counter value is randomly selected from [0, CWo], CWo is a contention window for orthogonal frequency division multiple access OFDMA subchannel contention, and CWo is an integer greater than 0.

B. The station receives a first trigger frame, where the first trigger frame is sent by an access point, the first trigger frame indicates that a quantity of subchannels for random access is N, and N is an integer greater than or equal to 0.

C. The station performs backoff, where the backoff operation includes: deducting, from the backoff counter value, the quantity N of subchannels for random access, to obtain a new backoff counter value; and if the new backoff counter value is 0 or a negative number, performing step D; or if the new backoff counter value is greater than 0, performing step B.

D. The station randomly selects one subchannel from the subchannels for random access, and then accesses the subchannel to send the uplink frame.

It should be noted that, the backoff counter value may further be generated according to a generating parameter that is broadcast by an AP and that is of the backoff counter value.

Specifically, the first trigger frame has two types. Type 1 is a pure scheduling type for allocating all subchannels to specific users for data transmission. Type 2 is for using some or all subchannels for random subchannel access by means of OFDMA contention. The first trigger frame mentioned in this patent specially refers to a trigger frame that includes a quantity of subchannels for random access. The trigger frame of the pure scheduling type may be considered as a trigger frame in which the quantity of subchannels for random access is 0, and an equivalent effect may be obtained.

Figure 3:
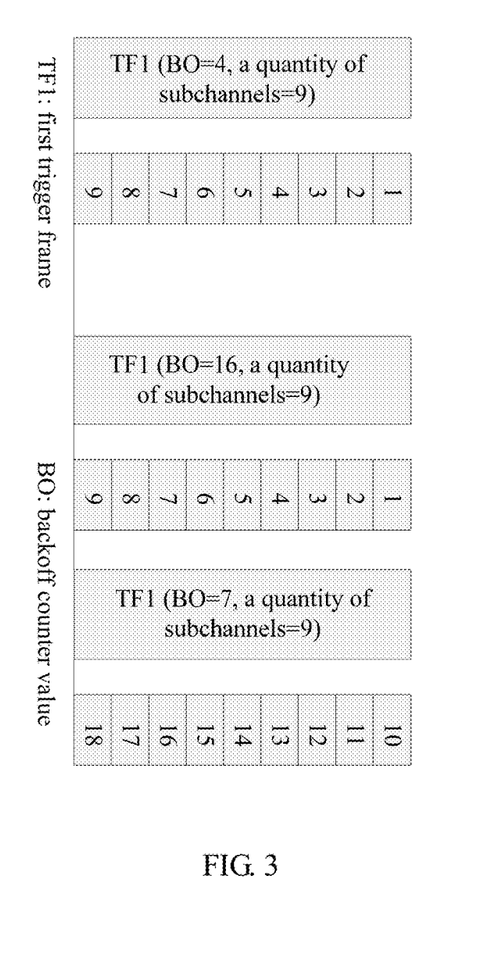
FIG. 3 is a schematic diagram of channel access according to Embodiment 1 of the present application.

The backoff process performed by the station in step C is explained with reference to FIG. 3. For the left side of FIG. 3, when a backoff counter BO value is 4 and a quantity of subchannels for random access indicated in the first trigger frame is 9, a new backoff counter BO' value is −5, and the station selects one subchannel from subchannels 1-9 and then accesses the subchannel to send the uplink frame. For the right side of FIG. 3, when a backoff counter BO value is 16 and a quantity of subchannels for random access indicated in the first trigger frame is 9, a new backoff counter BO' value is 7, and the BO' is not 0 or a negative number. If the station receives a first trigger frame again and BO''=−2, the station randomly selects one subchannel from subchannels 10-18 and then accesses the subchannel to send the uplink frame.

Optionally, the performing, by the station, channel access further includes:

receiving, by the station, a second trigger frame when the station fails in sending the uplink frame, where the second trigger frame is sent by an access point, and the second trigger frame includes a contention window adjustment parameter or a target CWo value; and adjusting, by the station, CWo after parsing the second trigger frame.

It should be noted that, there are multiple reasons for a failure of the station to send the uplink frame, for example, a collision caused by channel contention between stations, and a transmission failure due to a poor channel condition.

Specifically, the adjusting, by the station, CWo after parsing the second trigger frame includes at least three methods.

Method 1. The contention window adjustment parameter is compared with a preset threshold; and when the parameter is greater than the threshold, CWo is increased; or when the parameter is less than or equal to the threshold, CWo is kept unchanged.

Because the parameter and the threshold may be defined and transferred in a reciprocal form, method 1 may further be equivalently described as: the contention window adjustment parameter is compared with a preset threshold; and when the parameter is less than the threshold, CWo is increased; or when the parameter is greater than or equal to the threshold, CWo is kept unchanged.

Method 2. The contention window adjustment parameter is compared with two preset thresholds; and when the parameter is greater than a first threshold, CWo is increased; when the parameter is greater than a second threshold and is less than or equal to the first threshold, CWo is kept unchanged; or when the parameter is less than or equal to the second threshold, CWo is decreased.

Because the parameter and the threshold may be defined and transferred in a reciprocal form, method 2 may further be equivalently described as: the contention window adjustment parameter is compared with two preset thresholds; and when the parameter is less than a first threshold, CWo is increased; when the parameter is less than a second threshold and is greater than or equal to the first threshold, CWo is kept unchanged; or when the parameter is greater than or equal to the second threshold, CWo is decreased.

It should be noted that, the thresholds in method 1 and method 2 are defined by a standard or notified by an AP in a broadcast manner.

For example, the contention window adjustment parameter=a quantity of subchannels on which a collision occurs/(a quantity of subchannels for random contention+a quantity of subchannels for which contention is successful). Alternatively, an access point indicates, in the trigger frame, a quantity of subchannels on which a collision occurred in a previous round, a quantity of subchannels for which contention is successful, and all or a part of the quantity of subchannels for random contention. The station generates a contention window adjustment parameter according to a parameter indicated by the access point, where the contention window adjustment parameter is used to adjust CWo.

Method 3. A station compares a CWo value before adjustment with the target CWo value.

When CWo is greater than the target CWo value, CWo is decreased.

When CWo is equal to the target CWo value, CWo is kept unchanged.

When CWo is less than the target CWo value, CWo is increased.

It should be noted that, this embodiment may be separately used for OFDMA channel access, or may be combined with existing CSMA/CA channel access. Specifically, in this embodiment, backoff may be performed on an OFDMA channel access process and a CSMA/CA channel access process by using one backoff counter. Alternatively, this embodiment may be combined with existing CSMA/CA channel access, and two backoff counters are respectively used for the OFDMA channel access and the CSMA/CA channel access.

Compared with the conventional art 1, in the present application, when the backoff counter value is 0 or a negative number, the station randomly selects one subchannel from the subchannels for random access, and then accesses the subchannel to send the uplink frame. However, in the conventional art 1, after the backoff counter value is decreased to 0, a station sends an uplink frame on a subchannel on which the backoff counter value is decreased to 0.

In the present application, regardless of a quantity of stations that can be accessed, each access station performs random selection from all available subchannels. This may fully utilize resources of subchannels for random access. However, in the conventional art 1, according to the solution in which sending is performed on the subchannel on which the backoff counter value is decreased to 0 when 1 is subtracted from the backoff counter value for each subchannel for random access, some subchannels for random access may not be selected by any station, causing a waste of resources.

According to this embodiment of the present application, in a channel access process of a wireless local area network, a station generates a backoff counter value, and then the station performs a backoff operation after receiving a first trigger frame, where the backoff operation includes: deducting, from the backoff counter value, a quantity N of subchannels for random access, to obtain a new backoff counter value; and when the new backoff counter value is 0 or a negative number, randomly selecting, by the station, one subchannel from the subchannels for random access, and then accessing the subchannel to send an uplink frame. Using the foregoing method improves system access efficiency and avoids a waste of system resources.

Embodiment 2

Figure 4:
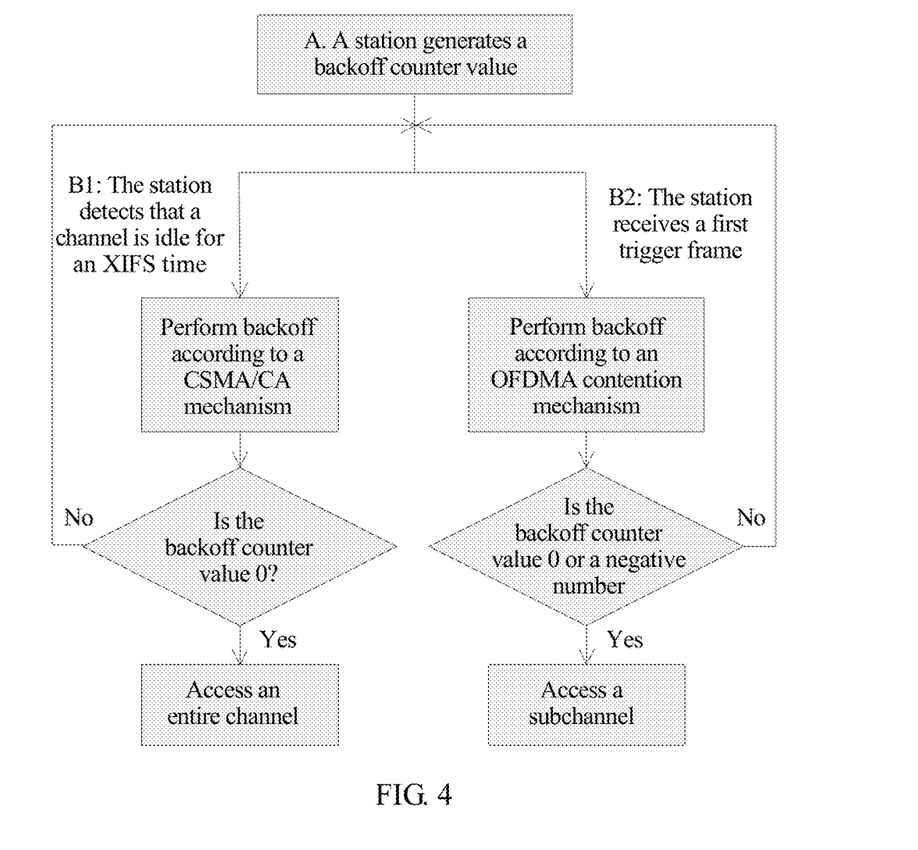
FIG. 4 is a block diagram of a process according to Embodiment 2 of the present application.

Embodiment 2 of the present application provides a data transmission method that is applied to a WLAN. The method may be applied to a station, such as an AP and STA 1 to STA 3 in FIG. 1. The station may support a next-generation WLAN standard, such as the 802.11ax standard. FIG. 4 is an interaction diagram of the data transmission method. Specific steps are as follows:

A. A station generates a backoff counter value.

B. The station performs backoff and updates the backoff counter value, specifically including:

B1. performing backoff by using a carrier sense multiple access with collision avoidance CSMA/CA mechanism after the station detects that a channel is idle for an interframe space XIFS; or B2. performing backoff according to an OFDMA contention mechanism after the station receives a first trigger frame, where the first trigger frame indicates a quantity N of subchannels for random access, and N is an integer greater than or equal to 0, where in step B1 and step B2, backoff is performed by using the same backoff counter; if the updated backoff counter value is 0 or a negative number, step C is performed; if the updated backoff counter value is greater than 0, step B is performed.

C. The station performs channel access, specifically including:

if the backoff counter value is decreased to 0 by performing step B1, sending, by the station, an uplink frame by using an entire channel; or if the backoff counter value is decreased to 0 or a negative number by performing step B2, sending, by the station, an uplink frame after accessing a subchannel for random access.

It should be noted that, in step B1, a conventional CSMA/CA channel access mechanism is executed, and for conventional CSMA/CA, there is a backoff counter for time domain backoff. In step B2, an OFDMA channel access mechanism is executed, and OFDMA channel contention also requires a backoff counter. In this embodiment, OFDMA contention and CSMA/CA contention use a same backoff counter.

An OFDMA contention mechanism in step B2 includes at least three methods.

Method 1. The performing backoff according to an OFDMA contention mechanism after the station receives a first trigger frame includes:

after the station receives the first trigger frame, decreasing the backoff counter value by $\beta N$, where $\beta$ is a real number greater than or equal to 0.

For example, after step B1 (the CSMA/CA channel access mechanism) is performed, the backoff counter value BO=5. Because the BO value is greater than 0, step B is performed. In this case, the station receives a trigger frame, where the trigger frame indicates that a quantity of subchannels is 3, and step B2 (the OFDMA channel access mechanism) is performed. BO=2, and because the BO value is greater than 0, step B is performed. In this case, after the station detects that a channel is idle for DIFS time, step B1 is performed. When the station detects that a channel is idle for two timeslots, BO=0, and in this case, step C is performed. Because the backoff counter value is decreased to 0 by the station by performing step B1, the station sends the uplink frame by using an entire channel. In conclusion, the station uses a same backoff counter when performing backoff in step B1 and step B2. In step B2, after the station receives a trigger frame, it means that the channel is in a busy state. In step B1, the station detects that the channel is idle for XIFS. Therefore, step B1 and step B2 cannot be simultaneously performed, and only one step can be selected to be performed. In addition, provided that the backoff counter value is not 0, the station cyclically performs step B.

Specifically, in step B1, after the channel is idle for XIFS, when the channel is idle for one timeslot (timeslot, which is generally 9 μs), the backoff counter value is decreased by 1. If the channel changes to be busy for a specific timeslot, the backoff counter stops performing backoff, where XIFS may be distributed coordination function interframe space (DIFS), point coordination function interframe space (PIFS), or arbitration interframe space (AIFS) according to different backoff mechanisms.

Figure 5:
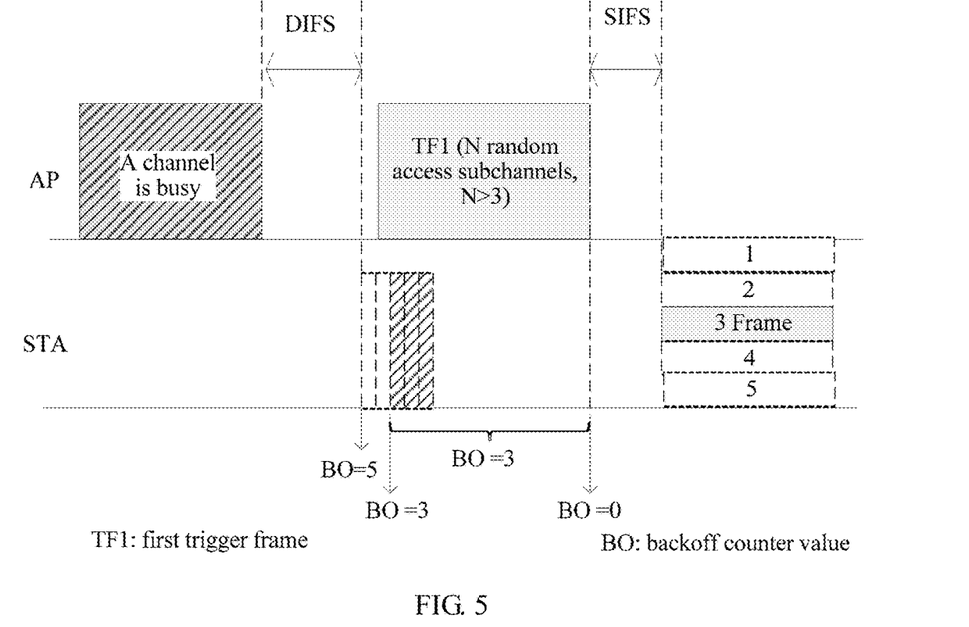
FIG. 5 is a schematic diagram of channel access according to Embodiment 2 of the present application.

The backoff process performed by the station in step B is explained with reference to FIG. 5. If an initial value of the backoff counter of the station is 5, after the station detects that a channel is idle for DIFS (it is assumed that a DCF contention mechanism is used), step B1 is performed, and when the channel is idle for two consecutive timeslots, the backoff counter value is decreased by 2, that is, a BO value is decreased to 3 from 5. Then the channel changes to a busy state because an access point sends a trigger frame, and after sensing that the channel changes to a busy state, the station suspends the backoff counter. After the STA detects that a frame received by the STA is a trigger frame (which usually needs to be sent by an access point associated with the STA), if the trigger frame indicates N subchannels for random access, the backoff counter value BO is decreased by N, and when N is greater than or equal to 3, the backoff counter value BO is decreased to 0 or a negative number. Because the backoff counter value is decreased to 0 by the station by performing step B2, the station randomly selects one subchannel from the subchannels 1-5 for random access indicated by the trigger frame, and sends the uplink frame after the trigger frame is ended for an SIFS time.

It should be noted that, $\beta$ may be a value such as 0.5, 1, or 2. Persons skilled in the art know that, a preferable manner is that $\beta$ is 1, and in this case, it is equivalent to that $\beta$ is not considered. If $\beta N$ is not an integer, a rounding operation needs to be performed. The rounding operation may be proximity rounding, down rounding, or up rounding, and a specific rounding operation to be used generally needs to be specified by a standard to ensure fairness.

Method 2. The performing backoff according to an OFDMA contention mechanism after the station receives a first trigger frame includes:

after the station receives the first trigger frame, decreasing the backoff counter value by 1.

Method 3. The performing backoff according to an OFDMA contention mechanism after the station receives a first trigger frame includes:

after the station receives the first trigger frame, decreasing the backoff counter value by 1 each time the station reads an available subchannel from the first trigger frame.

It should be noted that, in method 3, the trigger frame is set to indicate that three subchannels 1-3 for random access are included, and in this case, the backoff counter value is 2. After the station reads subchannel 1, BO=1; after the station reads subchannel 2, B0=0; and the station selects subchannel 2 as a subchannel for random access and sends the uplink frame on subchannel 2.

It should be noted that, considering a case in which the OFDMA subchannel contention and the CSMA/CA contention share a same backoff counter and the two contention mechanisms require different backoff speeds, different weighting factors need to be used for different backoff phases.

Optionally, the sending, by the station, an uplink frame after accessing a subchannel includes:

randomly selecting, by the station, one subchannel from the subchannels for random access to send the uplink frame; or selecting, by the station, a subchannel on which the backoff counter value is exactly decreased to 0 to send the uplink frame.

Optionally, the performing backoff by using a carrier sense multiple access with collision avoidance CSMA/CA mechanism after the station detects that a channel is idle for an interframe space XIFS includes:

after the station detects that a channel is idle for an interframe space XIFS, when the channel is idle for one timeslot, decreasing the backoff counter value by $\alpha$ until a channel status is changed to busy or the backoff counter value is decreased to 0, where $\alpha$ is a real number greater than or equal to 0.

$\alpha$ may be a value such as 0.5, 1, or 2. Persons skilled in the art know that, a preferable manner is that $\alpha$ is 1, and in this case, it is equivalent to that $\alpha$ is not considered. If $\alpha$ is not an integer, a rounding operation needs to be performed. The rounding operation may be proximity rounding, down rounding, or up rounding, and a specific rounding operation to be used generally needs to be specified by a standard to ensure fairness.

Optionally, the performing, by the station, channel access further includes:

receiving, by the station, a second trigger frame when the station fails in sending the uplink frame, where the second trigger frame is sent by an access point, and the second trigger frame includes a contention window adjustment parameter or a target CWo value; and adjusting, by the station, CWo after parsing the second trigger frame.

It should be noted that, there are multiple reasons for a failure of the station to send the uplink frame, for example, a collision caused by channel contention between stations, and a transmission failure due to a poor channel condition.

Specifically, the adjusting, by the station, CWo after parsing the second trigger frame includes at least more than three methods.

Method 1. The contention window adjustment parameter is compared with a preset threshold; and when the parameter is greater than the threshold, CWo is increased; or when the parameter is less than or equal to the threshold, CWo is kept unchanged.

Because the parameter and the threshold may be defined and transferred in a reciprocal form, method 1 may further be equivalently described as: the contention window adjustment parameter is compared with a preset threshold; and when the parameter is less than the threshold, CWo is increased; or when the parameter is greater than or equal to the threshold, CWo is kept unchanged.

Method 2. The contention window adjustment parameter is compared with two preset thresholds; and when the parameter is greater than a first threshold, CWo is increased; when the parameter is greater than a second threshold and is less than or equal to the first threshold, CWo is kept unchanged; or when the parameter is less than or equal to the second threshold, CWo is decreased.

Because the parameter and the threshold may be defined and transferred in a reciprocal form, method 2 may further be equivalently described as: the contention window adjustment parameter is compared with two preset thresholds; and when the parameter is less than a first threshold, CWo is increased; when the parameter is less than a second threshold and is greater than or equal to the first threshold, CWo is kept unchanged; or when the parameter is greater than or equal to the second threshold, CWo is decreased.

It should be noted that, the thresholds in method 1 and method 2 are defined by a standard or notified by an AP in a broadcast manner.

For example, the contention window adjustment parameter=a quantity of subchannels on which a collision occurs/(a quantity of subchannels for random contention+a quantity of subchannels for which contention is successful). Alternatively, an access point indicates, in the trigger frame, a quantity of subchannels on which a collision occurred in a previous round, a quantity of subchannels for which contention is successful, and all or a part of the quantity of subchannels for random contention. The station generates a contention window adjustment parameter according to a parameter indicated by the access point, where the contention window adjustment parameter is used to adjust CWo.

Method 3. A station compares a CWo value before adjustment with the target CWo value.

When CWo is greater than the target CWo value, CWo is decreased.

When CWo is equal to the target CWo value, CWo is kept unchanged.

When CWo is less than the target CWo value, CWo is increased.

Optionally, in another embodiment, when a beacon frame (Beacon) or the trigger frame indicates a next sending time of a trigger frame in advance, a description about how does the backoff counter work is as follows:

When the beacon frame or the trigger frame indicates a next target sending time of the trigger frame, a backoff method of the backoff counter is kept unchanged before the next target sending time of the trigger frame arrives, and backoff is performed according to CSMA/CA time domain backoff in an existing standard or according to a manner in another embodiment of this patent. After the next target sending time of the trigger frame arrives and before the trigger frame is received, the station stops performing backoff for the backoff counter regardless of whether the channel is busy or idle.

Optionally, in another embodiment, when a station receives a trigger frame sent by an access point, a result of the backoff counter value minus the quantity of subchannels for random access indicated in the trigger frame is greater than 0. When a parameter for controlling generation of CWo or a backoff counter in the trigger frame changes (in comparison with the backoff counter value previously generated by the station), a description about how to set the backoff counter is as follows:

First Method

The station keeps the current backoff counter value unchanged, and ignores a change of a backoff counter generating parameter associated with an AP. Although being simple, the method is not efficient enough because a change of an access point control parameter is not considered.

Second Method:

The station generates a new backoff counter value according to the backoff counter generating parameter associated with an access point, and sets the current backoff counter value to the new backoff counter value. The method features that a change of an access point control parameter is considered, helping improve access efficiency, but a historical backoff process is not considered. Therefore, a fairness problem exists between stations (for example, after a period of backoff of a specific station, the current backoff counter value is quite small, but a backoff counter value regenerated according to an access point adjustment parameter is quite large). However, it is still fair between stations in terms of long-term statistics.

Compared with the conventional art 1, according to this embodiment of the present application, in a channel access process of a wireless local area network, one backoff counter is used for OFDMA subchannel access and CSMA/CA channel access, reducing system complexity. In addition, in an OFDMA subchannel access process, random channel access is used, improving system access efficiency.

Embodiment 3

Figure 6:
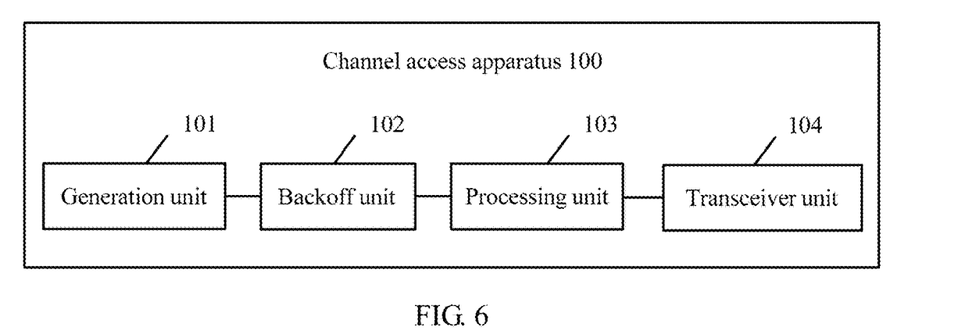
FIG. 6 is a diagram of a logical structure according to Embodiment 1 of the present application.

FIG. 6 is a schematic block diagram of a channel access apparatus in a wireless local area network according to Embodiment 3 of the present application. For example, the channel access apparatus is a station, or a dedicated circuit or chip that implements a related function. A channel access apparatus 100 shown in FIG. 6 includes a generation unit 101, a backoff unit 102, a processing unit 103, and a transceiver unit 104. For example, the channel access apparatus 100 may be an AP or STA 1 to STA 3 shown in FIG. 1.

The generation unit 101 is configured to generate a backoff counter value, where the backoff counter value is randomly selected from [0, CWo], CWo is a contention window for orthogonal frequency division multiple access OFDMA subchannel contention, and CWo is an integer greater than 0.

The backoff unit 102 is configured to perform backoff, where the backoff operation includes: deducting, from the backoff counter value, a quantity N of subchannels for random access, to obtain a new backoff counter value.

The processing unit 103 is configured to perform a determining operation to determine whether the backoff counter value is greater than 0.

The transceiver unit 104 is configured to receive a first trigger frame, where the first trigger frame is sent by an access point, the first trigger frame indicates that the quantity of subchannels for random access is N, and N is an integer greater than or equal to 0.

The transceiver unit 104 is further configured to perform channel access, including: sending an uplink frame on one subchannel of the subchannels for random access.

Optionally, the performing, by the transceiver unit, channel access further includes: receiving, by the transceiver unit, a second trigger frame when the transceiver unit fails in sending the uplink frame, where the second trigger frame is sent by the access point, and the second trigger frame includes a contention window adjustment parameter or a target CWo value; and adjusting, by the processing unit, CWo after parsing the second trigger frame.

Optionally, the adjusting, by the processing unit, CWo after parsing the second trigger frame includes at least three methods.

Method 1. The contention window adjustment parameter is compared with a preset threshold; and when the parameter is greater than the threshold, CWo is increased; or when the parameter is less than or equal to the threshold, CWo is kept unchanged.

Method 2. The contention window adjustment parameter is compared with two preset thresholds; and when the parameter is greater than a first threshold, CWo is increased; when the parameter is greater than a second threshold and is less than or equal to the first threshold, CWo is kept unchanged; or when the parameter is less than or equal to the second threshold, CWo is decreased.

Method 3. A station compares a CWo value before adjustment with the target CWo value; and when CWo is greater than the target CWo value, CWo is decreased; when CWo is equal to the target CWo value, CWo is kept unchanged; or when CWo is less than the target CWo value, CWo is increased.

According to this embodiment of the present application, in a channel access process of a wireless local area network, the generation unit generates a backoff counter value, and then the backoff unit performs a backoff operation after the transceiver unit receives a first trigger frame, where the backoff operation includes: deducting, from the backoff counter value, a quantity N of subchannels for random access, to obtain a new backoff counter value; and when the new backoff counter value is 0 or a negative number, randomly selecting, by the transceiver unit, one subchannel from the subchannels for random access, and then accessing the subchannel to send an uplink frame. Using the foregoing method improves system access efficiency and avoids a waste of system resources.

Embodiment 4

Figure 7:
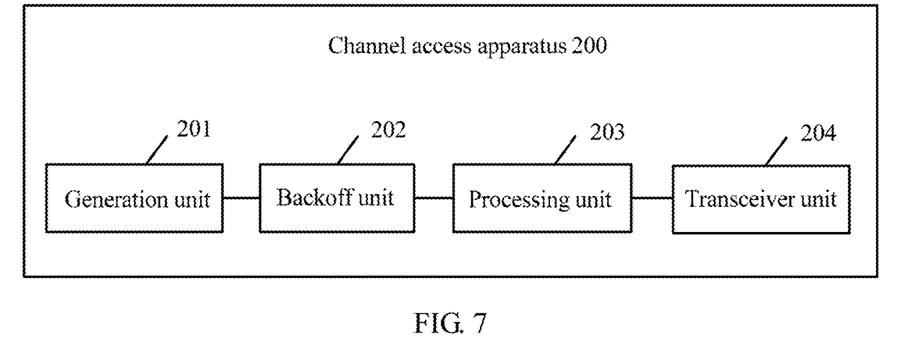
FIG. 7 is a diagram of a logical structure according to Embodiment 2 of the present application.

FIG. 7 is a schematic block diagram of a channel access apparatus in a wireless local area network according to Embodiment 4 of the present application. For example, the channel access apparatus is a station, or a dedicated circuit or chip that implements a related function. A channel access apparatus 200 shown in FIG. 7 includes a generation unit 201, a backoff unit 202, a processing unit 203, and a transceiver unit 204. For example, the channel access apparatus 200 may be an AP or STA 1 to STA 3 shown in FIG. 1.

The generation unit 201 is configured to generate a backoff counter value.

The backoff unit 202 is configured to perform backoff and update the backoff counter value, specifically including: performing backoff by using a carrier sense multiple access with collision avoidance CSMA/CA mechanism after the transceiver unit detects that a channel is idle for an interframe space XIFS; or performing backoff according to an OFDMA contention mechanism after the transceiver unit receives a first trigger frame, where the first trigger frame indicates a quantity N of subchannels for random access, and N is an integer greater than or equal to 0.

The processing unit 203 is configured to perform a determining operation to determine whether the backoff counter value is greater than 0.

The transceiver unit 204 is further configured to perform channel access, including: if the backoff counter value is decreased to 0 by performing step B1, sending, by the transceiver unit, an uplink frame by using an entire channel; or if the backoff counter value is decreased to 0 or a negative number by performing step B2, sending, by the transceiver unit, an uplink frame after accessing a subchannel for random access.

Optionally, the performing backoff according to an OFDMA contention mechanism after a transceiver unit receives a first trigger frame includes:

after the transceiver unit receives the first trigger frame, decreasing the backoff counter value by $\beta N$, where $\beta$ is a real number greater than or equal to 0.

Optionally, the performing backoff according to an OFDMA contention mechanism after a transceiver unit receives a first trigger frame includes at least three methods.

Method 1. After the transceiver unit receives the first trigger frame, the backoff counter value is decreased by 1.

Method 2. After the transceiver unit receives the first trigger frame, the backoff counter value is decreased by 1 each time the processing unit reads an available subchannel from the first trigger frame.

Method 3. The transceiver unit randomly selects one subchannel from the subchannels for random access to send the uplink frame; or the transceiver unit selects a subchannel on which the backoff counter value is exactly decreased to 0 to send the uplink frame.

Optionally, the performing backoff by using a carrier sense multiple access with collision avoidance CSMA/CA mechanism after a transceiver unit detects that a channel is idle for an interframe space XIFS includes: after the transceiver unit detects that a channel is idle for an interframe space XIFS, when the channel is idle for one timeslot, decreasing the backoff counter value by $\alpha$ until a channel status is changed to busy or the backoff counter value is decreased to 0, where $\alpha$ is a real number greater than or equal to 0.

Optionally, the performing, by the transceiver unit, channel access further includes: receiving, by the transceiver unit, a second trigger frame when the transceiver unit fails in sending the uplink frame, where the second trigger frame is sent by an access point, and the second trigger frame includes a contention window adjustment parameter or a target contention window CWo value; and adjusting, by the processing unit, CWo after parsing the second trigger frame, where CWo is a contention window for orthogonal frequency division multiple access OFDMA subchannel contention.

Specifically, the adjusting, by the processing unit, a contention window CWo after parsing the second trigger frame includes at least three methods.

Method 1. The contention window adjustment parameter is compared with a preset threshold; and when the parameter is greater than the threshold, CWo is increased; or when the parameter is less than or equal to the threshold, CWo is kept unchanged.

Method 2. The contention window adjustment parameter is compared with two preset thresholds; and when the parameter is greater than a first threshold, CWo is increased; when the parameter is greater than a second threshold and is less than or equal to the first threshold, CWo is kept unchanged; or when the parameter is less than or equal to the second threshold, CWo is decreased.

Method 3. The adjusting, by the processing unit, a contention window CWo after parsing the second trigger frame specifically includes: comparing, by a station, a CWo value before adjustment with the target CWo value; and when CWo is greater than the target CWo value, decreasing CWo; when CWo is equal to the target CWo value, keeping CWo unchanged; or when CWo is less than the target CWo value, increasing CWo.

According to this embodiment of the present application, in a channel access process of a wireless local area network, one backoff counter is used for OFDMA subchannel access and CSMA/CA channel access, reducing system complexity. In addition, in an OFDMA subchannel access process, random channel access is used, improving system access efficiency.

Embodiment 5

Correspondingly, Embodiment 5 provides a channel access device, including a processor. For a specific channel access method, refer to the methods in the foregoing embodiments (as shown in FIG. 2 to FIG. 5), and details are not described herein again. The processor may be a general purpose processor, a digital signal processor, an application-specific integrated circuit, a field programmable gate array, or another programmable logical device, discrete gate or transistor logical device, or discrete hardware component, and the processor may implement or execute the methods, steps, and logical block diagrams disclosed in the embodiments of the present application. The general purpose processor may be a microprocessor, or any conventional processor, or the like. The steps of the method disclosed with reference to the embodiments of the present application may be directly performed by a hardware processor, or may be performed by using a combination of hardware in the processor and a software module. It is easy to understand that, when contending for a channel, the foregoing channel access devices may be located in a station.

Figure 8:
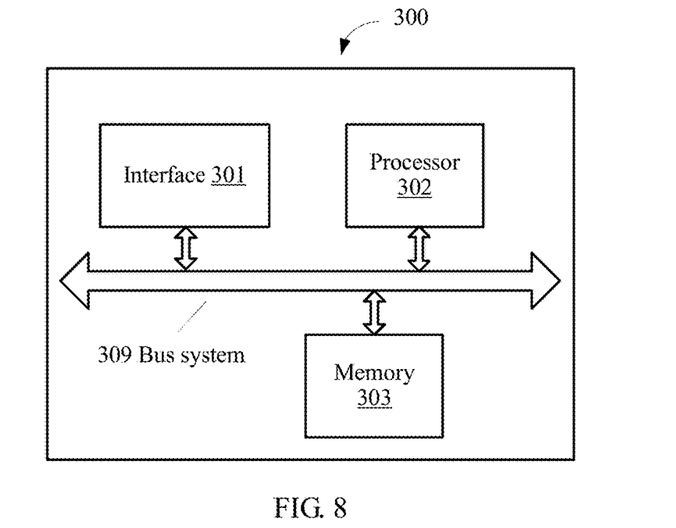
FIG. 8 is a diagram of a physical structure according to an embodiment of the present application.

FIG. 8 is a block diagram of a channel access device station according to Embodiment 5 of the present application. An interface 301, a processor 302, and a memory 303 are included in FIG. 8. The processor 302 controls an operation of a station 300. The memory 303 may include a read-only memory and a random access memory, and provide an instruction and data to the processor 302. A part of the memory 303 may further include a non-volatile random access memory (NVRAM). Components of the station 300 are coupled together by using a bus system 309. In addition to a data bus, the bus system 309 includes a power bus, a control bus, and a status signal bus. However, for clear description, various types of buses in the figure are marked as the bus system 309.

The channel access method disclosed in the foregoing embodiments of the present application may be applied to the processor 302, or implemented by the processor 302. In an implementation process, the steps in the foregoing methods may be completed by using an integrated logic circuit of hardware in the processor 302 or an instruction in a form of software. The processor 302 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of the present application. The general purpose processor may be a microprocessor, or any conventional processor, or the like. The steps of the method disclosed with reference to the embodiments of the present application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 303, and the processor 302 reads information from the memory 303 and completes the steps in the foregoing methods in combination with hardware of the processor.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A channel access method, applied to a wireless local area network, and comprising:
    generating, by a station, a backoff counter value, wherein the backoff counter value is randomly selected from a range from zero to CWo, CWo is a contention window for orthogonal frequency division multiple access (OFDMA) subchannel contention, and CWo is an integer greater than 0;
    receiving, by the station, a first trigger frame, wherein the first trigger frame is sent by an access point, the first trigger frame indicates a quantity of subchannels for random access, and the quantity of subchannels for random access is an integer greater than or equal to 0;
    performing, by the station, backoff operation, wherein the backoff operation comprises: deducting, from the backoff counter value, the quantity of subchannels for random access, to obtain a new backoff counter value;
    when the new backoff counter value is 0 or a negative number,
    performing, by the station, channel access, by randomly selecting one subchannel from the subchannels for random access to send an uplink frame; or when the new backoff counter value is greater than 0, receiving, by the station a second trigger frame sent by the access point, wherein the second trigger frame indicates a quantity of subchannels for random access, and the quantity of subchannels for random access is an integer greater than or equal to 0.

2. The method according to claim 1, wherein the performing the channel access further comprises:
    receiving, by the station, a second trigger frame when the station fails in sending the uplink frame, wherein the second trigger frame is sent by the access point, and the second trigger frame comprises a contention window adjustment parameter or a target CWo value; and
    adjusting, by the station, CWo after parsing the second trigger frame.

3. The method according to claim 2, wherein the adjusting CWo after parsing the second trigger frame comprises:
    comparing the contention window adjustment parameter with a preset threshold; and when the parameter is greater than the preset threshold, increasing CWo; or when the parameter is less than or equal to the preset threshold, keeping CWo unchanged.

4. The method according to claim 2, wherein the adjusting CWo after parsing the second trigger frame comprises:
    comparing the contention window adjustment parameter with two preset thresholds; and when the parameter is greater than a first threshold, increasing CWo; when the parameter is greater than a second threshold and is less than or equal to the first threshold, keeping CWo unchanged; or when the parameter is less than or equal to the second threshold, decreasing CWo.

5. The method according to claim 2, wherein the adjusting CWo after parsing the second trigger frame comprises:
    comparing, by the station, a CWo value before adjustment with the target CWo value; and
    when the CWo value is greater than the target CWo value, decreasing CWo;
    when the CWo value is equal to the target CWo value, keeping CWo unchanged; or
    when the CWo value is less than the target CWo value, increasing CWo.

6. A channel access apparatus, applied to a wireless local area network, and comprising:
    a processor and a transceiver; wherein
    the processor is configured to:
        generate a backoff counter value, wherein the backoff counter value is randomly selected from a range from zero to CWo, CWo is a contention window for orthogonal frequency division multiple access (OFDMA) subchannel contention, and CWo is an integer greater than 0;
    the transceiver is configured to:
        receive a first trigger frame, wherein the first trigger frame is sent by an access point, the first trigger frame indicates a quantity of subchannels for random access, and the quantity of subchannels for random access is an integer grater than or equal to 0;
    the processor is further configured to:
        perform backoff operation, wherein the backoff operation comprises: deducting, from the backoff counter value, the quantity of subchannels for random access, to obtain a new backoff counter value; and
        perform a determining operation to determine whether the backoff counter value is greater than 0;
    the transceiver is further configured to:
        receive a second trigger frame when the new backoff counter value is greater than 0, wherein the second trigger frame is sent by the access point, the second trigger frame indicates a quantity of subchannels for random access, and the quantity of subchannels for random access is an integer greater than or equal to 0; and
        perform channel access when the new backoff counter value is 0 or a negative number by sending an uplink frame on one randomly selected subchannel of the subchannels for random access.

7. The apparatus according to claim 6, wherein when performing the channel access, the transceiver is further configured to:
    receive a second trigger frame when the transceiver fails in sending the uplink frame, wherein the second trigger frame is sent by the access point, and the second trigger frame comprises a contention window adjustment parameter or a target CWo value; and
    the processor is configured to adjust CWo after parsing the second trigger frame.

8. The apparatus according to claim 7, wherein when adjusting CWo after parsing the second trigger frame, the processor is further configured to:
compare the contention window adjustment parameter with a preset threshold; and when the parameter is greater than the preset threshold, increasing CWo; or when the parameter is less than or equal to the preset threshold, keeping CWo unchanged.

9. The apparatus according to claim 7, wherein when adjusting CWo after parsing the second trigger frame, the processor is further configured to comprises:
compare the contention window adjustment parameter with two preset thresholds; and when the parameter is greater than a first threshold, increasing CWo; when the parameter is greater than a second threshold and is less than or equal to the first threshold, keeping CWo unchanged; or when the parameter is less than or equal to the second threshold, decreasing CWo.

10. The apparatus according to claim 7, wherein when adjusting CWo after parsing the second trigger frame, the processor is further configured to:
compare a CWo value before adjustment with the target CWo value; and
when the CWo value is greater than the target CWo value, decreasing CWo;
when the CWo value is equal to the target CWo value, keeping CWo unchanged; or
when the CWo value is less than the target CWo value, increasing CWo.

11. A non-transitory computer readable storage medium comprising processor-executable instructions which, when executed by a processor, cause the processor to implement operations including:
generating, a backoff counter value, wherein the backoff counter value is randomly selected from a range from zero to CWo, CWo is a contention window for orthogonal frequency division multiple access (OFDMA) sub-channel contention, and CWo is an integer greater than 0;
receiving, a first trigger frame, wherein the first trigger frame is sent by an access point, the first trigger frame indicates that a quantity of subchannels for random access, and the quantity of subchannels for random access is an integer greater than or equal to 0;
performing, backoff operation, wherein the backoff operation comprises: deducting, from the backoff counter value, the quantity of subchannels for random access, to obtain a new backoff counter value; and
when the new backoff counter value is 0 or a negative number, performing, channel access, by randomly selecting one subchannel from the subchannels for random access to send an uplink frame; or when the new backoff counter value is greater than 0, receiving a second trigger frame sent by the access point, the second trigger frame indicates a quantity of subchannels for random access, and the quantity of subchannels for random access is an integer greater than or equal to 0.

* * * * *